R. CORETH.
Gang-Plows.
No. 142,084.
2 Sheets--Sheet 1.
Patented August 26, 1873.
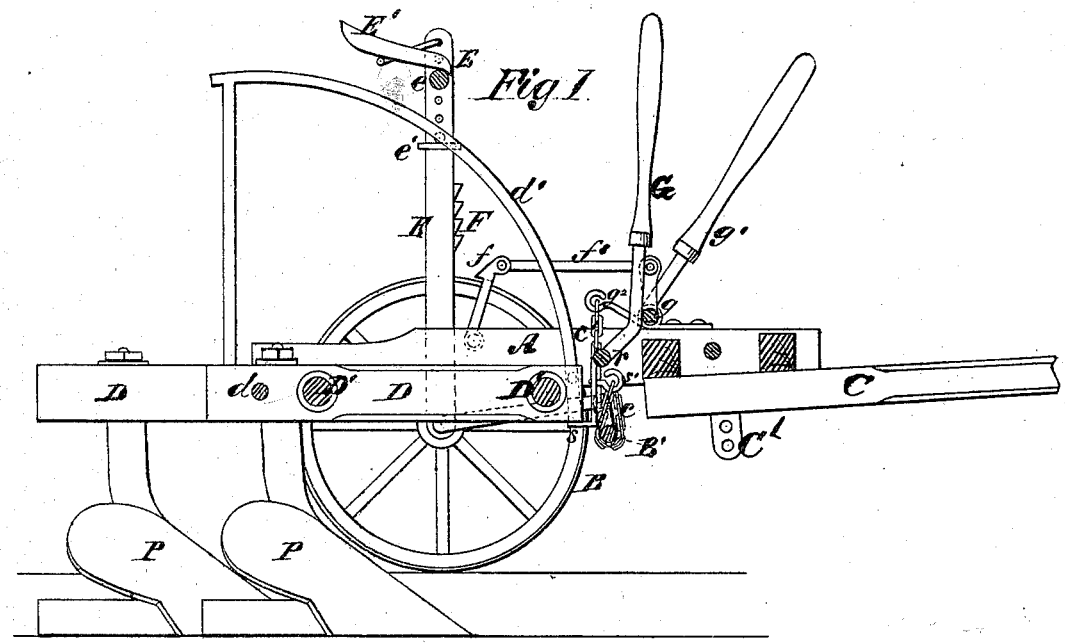
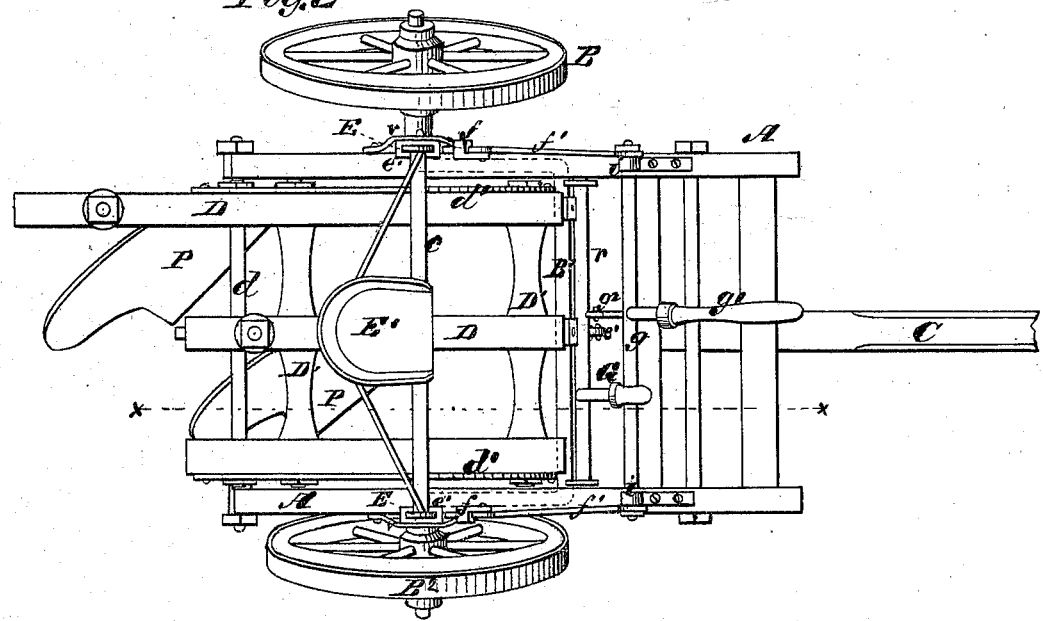

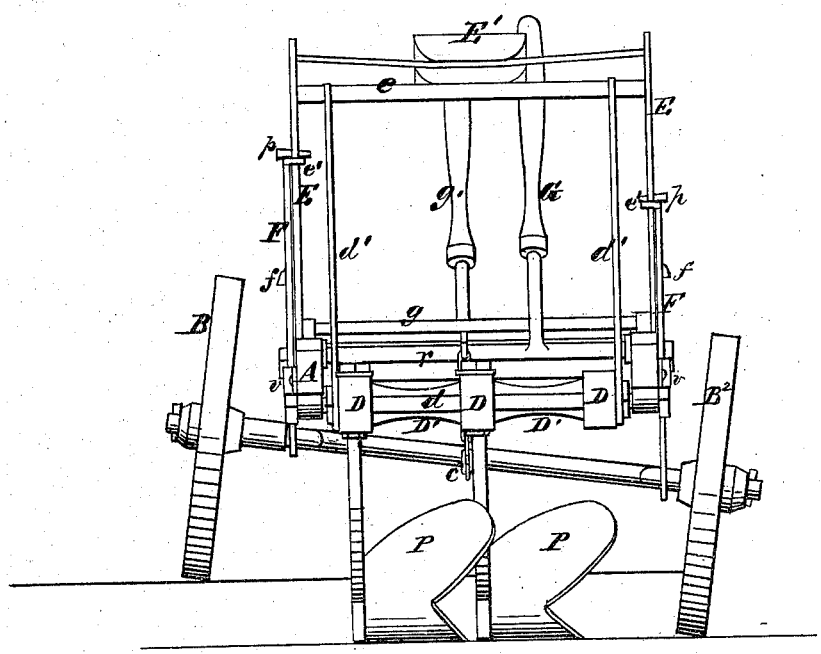

UNITED STATES PATENT OFFICE.

RUDOLPH CORETH, OF WEST BELLEVILLE, ILLINOIS.

IMPROVEMENT IN GANG-PLOWS.

Specification forming part of Letters Patent No. 142,084, dated August 26, 1873; application filed June 21, 1873.

*To all whom it may concern:*

Be it known that I, RUDOLPH CORETH, formerly of New Braunfels, in the county of Comal and State of Texas, but now of West Belleville, in the county of St. Clair and State of Illinois, have invented certain novel Improvements in Gang-Plows; and I do hereby declare that the following is a full, clear, and exact description thereof, reference being had to the accompanying drawings making part of this specification, in which—

Figure 1, Plate 1, is a section taken longitudinally and vertically through the plow in the plane indicated by dotted line $xx$, Fig. 2. Fig. 2, Plate 1, is a top view of the plow. Fig. 3, Plate 2, is an elevation of the rear end of the same.

Similar letters of reference indicate corresponding parts in the several figures.

This invention relates to certain novel improvements for operating plows which are run in gangs and applied to a revolving frame in a carriage-frame. My objects are to so construct a revolving plow-frame that when it is released from front supports the plows will be thrown out of the ground and turned completely over by the power of the team alone; also, to mount the carriage-frame on wheels which have a cranked axle, supported in front by chains, said axle having its bearings in standard-racks, to which the carriage-frame is adjustably applied; also, to employ devices for holding up the plows when they are raised, raising the plows, and regulating their depth, all as will be hereinafter explained.

The following description of my improvements will enable others skilled in the art to understand them.

In the accompanying drawings, A represents a carriage-frame, which is composed of longitudinal side bars, connected together by transverse bars, to which latter a draft-tongue, C, is secured, having a double-tree clevis, C', applied to it. This frame is supported upon a cranked axle, $B^1$, having wheels B $B^2$ on its extremities, which axle extends forward and is suspended by means of chains $c\ c'$ from short vibrating arms $g^2\ s$. The ends of the cranked axle $B^1$ have their bearings in standard-racks F F, which extend upward through guides $v\ v$ on the side bars of frame A, and at their upper ends $e'\ e'$ they embrace two standards, E E, which are secured rigidly to, and rise perpendicularly from, the side bars of frame A. By thus mounting the carriage-frame on the crank-axle $B^1$, this frame is vertically adjustable for running the plows at any desired depth, or for raising them free from the ground. The front edges of the standard-racks F have teeth formed on them, with which pawls $f$ engage, which pawls are pivoted to the side bars of frame A, so as to receive vibration forward and backward by means of rods $f'$, which connect them to arms formed on a transverse rock-shaft, $g$, which is supported in bearings $i\ i$. A hand-lever, $g^1$, is applied to the rock-shaft $g$, by means of which a person sitting on a seat, E', which is supported by a cross-bar near the upper ends of the standards E E, can conveniently engage the pawls $f$ with the standard-racks or disengage these pawls therefrom. D D' represent bars which are secured together and form a plow-frame. This frame is connected, by a pivot-bar, $d$, to the rear extremities of the frame A, and plows P may be secured to its upper and lower sides in the same manner and for the same purpose as described in my Letters Patent numbered 118,694; or the plows may be secured on only one side of said frame, as shown in the drawings. The plow-frame is allowed to revolve freely about its transverse pivot-bar $d$, and at its front end it is supported by steps $s$, which are fixed to a transverse rock-bar, $r$, to which a hand-lever, G, is applied. By drawing back the lever G the steps $s$ will be moved from beneath the front end of the plow-frame, which will allow this end to drop and the frame to be turned completely over. To the longitudinal side-bars of the plow-frame I rigidly secure two lifting-arcs, $d'\ d'$, the radiuses of which are such that, as the plow-frame is turned over to lift the plows out of the ground, the arcs, rolling upon the ground, will lift the carriage-frame bodily, when it can be caught and held up by the pawls $f$, thereby leaving the plows free from the ground when they have been turned completely, and their frame is caught and held by the steps $s$. The standards E E, which are secured to the carriage-frame, are perforated, as shown in Fig. 1, for the purpose of receiving pins $p$, against which the upper ends of the standard-racks F bear. By adjusting these pins in different holes the plows can be run in the ground at any desired depth.

The first furrow is made with both carriage-wheels on the unplowed ground and both standard-racks bearing against the pins $p\ p$. The subsequent slices are turned with one wheel on the unplowed ground and the other in the furrow, as shown in Fig. 3. When the plows reach the end of a furrow, and it is desired to raise them out of the ground, or, when for any other reason, it is desired to lift them from the ground, the lever $g^1$ is moved forward and the lever G moved backward. This will release the plow-frame from its steps $s$, and also disengage the pawls $f$ from the standard-racks. The forward movement of the team will then cause the plow-frame to revolve and the arcs to lift the carriage-frame to such height as will free the plows from the ground when they have been turned completely over and are held up again by the steps $s$. The plows are then lowered again and brought into working position by releasing the pawls $f$ from their standard-racks.

Having described my invention, what I claim as new, and desire to secure by Letters Patent, is—

1. The standard-racks F F, mounted on the cranked axle $B^1$, applied to the standards E E on frame A A, and having combined with them the pawls $f\ f$ and the devices for operating these pawls, substantially as described.

2. The steps $s$, applied to a rack-rod, $r$, having a hand-lever, G, on it, in combination with the revolving-frame, carrying one or more plows, P, and a cranked axle, B', suspended in front out of the way of said frame, substantially as described.

3. The standards E, perforated and provided with adjustable stop-pins $p$, in combination with the standard racks and their pawls, and with lifting-arcs $d'$ on a turning plow-frame, substantially as described.

RUDOLPH CORETH.

Witnesses:
JOHN WEBER,
GEORGE C. BUNSEN.